United States Patent [19]
Gouriou et al.

[11] Patent Number: 5,797,750
[45] Date of Patent: *Aug. 25, 1998

[54] METHOD AND APPARATUS FOR DETERMINING THE FOUNDATION MAKEUP COLOR THAT SUBSTANTIALLY REPRODUCES A PERSON'S NATURAL SKIN COLOR

[75] Inventors: Eliane Gouriou, Issy-Les-Moulineaux; Annie Raynal; Régine Baudet, both of Orleans; Jean-Pierre Hulaud, La Forest Landerneau; Jean-Paul Biesse, Baccon, all of France

[73] Assignee: Parfums Christian Dior, Paris, France

[*] Notice: The term of this patent shall not extend beyond the expiration date of Pat. No. 5,478,238.

[21] Appl. No.: 456,705

[22] Filed: Jun. 1, 1995

Related U.S. Application Data

[62] Division of Ser. No. 129,248, Sep. 29, 1993, Pat. No. 5,478,238.

[30] Foreign Application Priority Data

Aug. 3, 1993 [EP] European Pat. Off. ............ 93401994

[51] Int. Cl.$^6$ ............................................ G09B 19/00
[52] U.S. Cl. .................................... 434/100; 434/98

[58] Field of Search ........................ 434/100, 98, 81; 132/200; 382/6; 364/413.01

[56] References Cited

U.S. PATENT DOCUMENTS

| | | | |
|---|---|---|---|
| 4,160,271 | 7/1979 | Grayson et al. | 434/100 X |
| 5,311,293 | 5/1994 | MacFarlane et al. | 434/100 X |
| 5,313,267 | 5/1994 | MacFarlane et al. | 434/100 X |
| 5,478,238 | 12/1995 | Gouriou et al. | 434/100 |
| 5,495,338 | 2/1996 | Gouriou et al. | 434/100 X |

*Primary Examiner*—Jeffrey A. Smith
*Attorney, Agent, or Firm*—Bryan Cave LLP

[57] ABSTRACT

The invention relates to a method and Apparatus for determining the color of a foundation makeup comprising a device for measuring the color of the skin on an arm of a person computing and determining the skin color measured and comparing same with a data base containing a palette of reference foundation colors substantially covering a representative sample of a population of given individuals, the data base containing at least the color of the skin for each individual and a reference foundation color associated with one or more of the skin colors in the data base; and determining from the data base the foundation color associated with the skin color to reproduce the skin color in the data base corresponding to the measured skin color of a person.

12 Claims, 11 Drawing Sheets

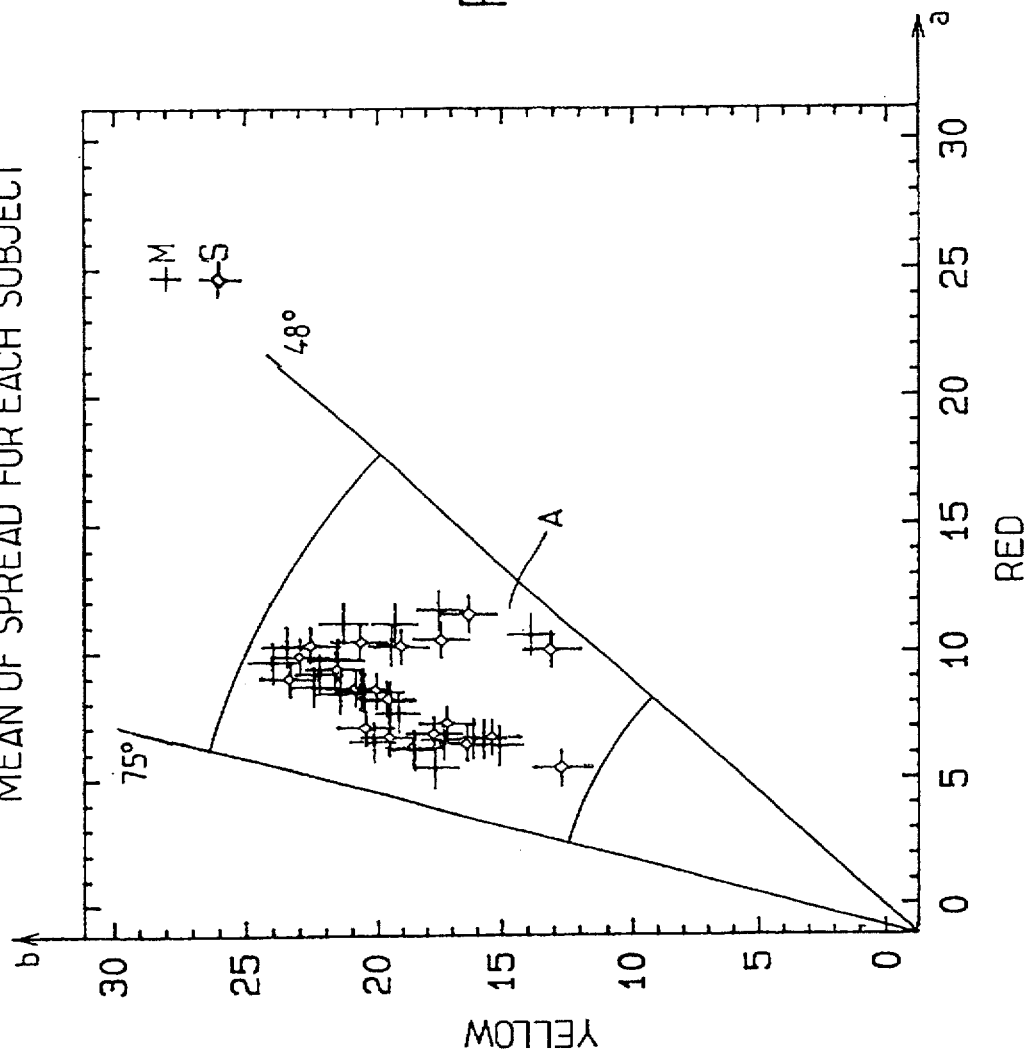

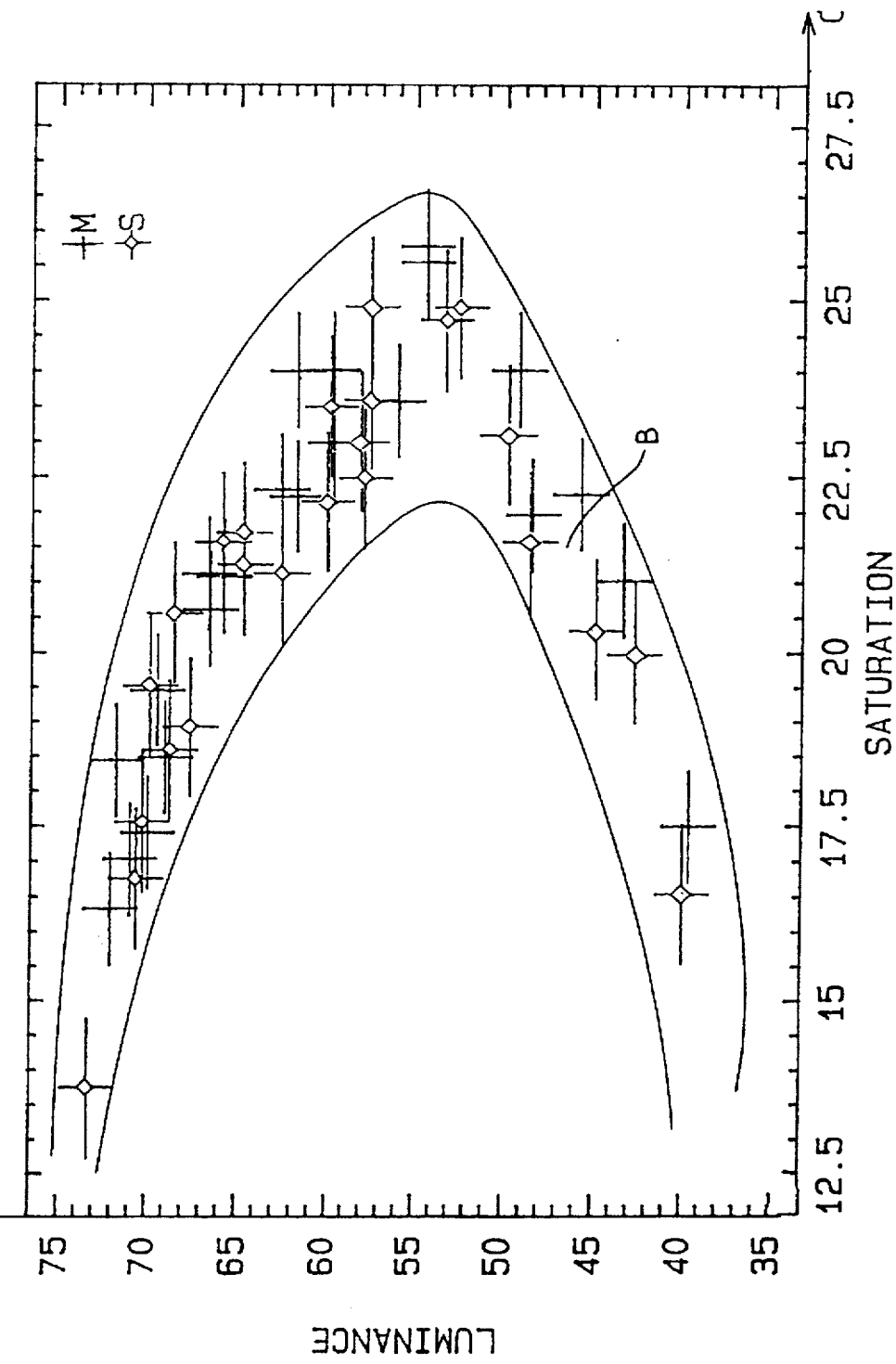

METHOD AND APPARATUS FOR DETERMINING THE FOUNDATION MAKEUP COLOR THAT SUBSTANTIALLY REPRODUCES A PERSON'S NATURAL SKIN COLOR

This is a divisional of U.S. application Ser. No. 08/129,248, filed Sep. 29, 1993 (now U.S. Pat. No. 5,478,238).

The present invention relates essentially to a method of determining the foundation makeup color that substantially reproduces a person's natural skin color, and to apparatus constituting an application thereof.

BACKGROUND OF THE INVENTION

In the prior art, U.S. Pat. No. 4,561,850 discloses a device in the form of a disk for matching colors as a function of the color of the skin and the color of the eyes of a user for the purpose of personalizing makeup. The solution described in that document is approximate, depends on the subjectivity of the user, and is thus quite imperfect.

FR-A-2 194 335 is a similar document describing a device in the form of a disk with a collection of hair colors, eye colors, and skin colorings for determining basic foundation colors suitable for the person concerned. That determination is likewise purely qualitative, depends on the subjectivity of the user, and is thus far from perfect.

DE-A-3 419 568 describes yet another solution that is similar but which nevertheless make use of a computer and a memory for determining makeup colors that are personalized for the person under consideration. However, the means implemented are particularly vague and can therefore lead only to a solution that is particularly imperfect, non-reproducible, and not very reliable, thus severely limiting commercial application thereof.

In addition, EP-A-0 226 959 describes a very complex apparatus constituting a makeup simulator comprising a video camera coupled to a computer with a display screen for color images, together with means for processing the video signals provided by the video camera to enable various color changes to be implemented on the displayed color image, which changes are supposed to represent the application of different colors of makeup, this is repeated until simulated makeup is obtained that is accepted by the user.

That system cannot be operated without an expert being present on the commercial premises, thereby greatly limiting the availability of the system.

OBJECTS AND SUMMARY OF THE INVENTION

Thus, an object of the present invention is to solve a novel technical problem consisting in providing a solution that enables a foundation makeup color to be determined that substantially reproduces the natural skin color of a person without requiring action from an expert on the commercial premises where determination is performed.

Another object of the present invention is to solve this novel technical problem by means of a solution that is particularly simple, reliable, reproducible, and relatively cheap.

These technical problems are solved for the first time by the present invention in a manner that is simple, reproducible, cheap, and operable on a commercial scale, in particular in hairdressing or beauty parlors, without requiring action by a person with real qualifications on the subject.

Thus, in a first aspect, the present invention provides a method of determining the foundation makeup color that substantially reproduces the natural skin color of a person, the method comprising the following steps:

a) in a prior step, establishing a data base containing a palette of reference foundation colors substantially covering a representative sample of a population of given individuals, said data base containing at least the following data:

the color of the skin on the inside of the arm or on the outside of the arm or both on the inside and on the outside of the arm, preferably in a middle region of the forearm in which vein color is not particularly apparent, and which does not contain skin marks; and a reference foundation color associated with one or more of the skin colors in said data base;

b) the color of the skin of a person concerned is measured on the inside of the arm or on the outside of the arm or both on the inside and on the outside of the arm; and c) the measured skin color of the person concerned is compared with the skin colors in the data base to determine which color in the data base is identical or close thereto, and consequently to determine from said data base which foundation color is associated with said skin color in said data base.

In a particular implementation, in the prior step, the hair color of each individual constituting the data base is input into the data base so as to constitute as many groups of individuals as there are hair colors taken into account; in which case, while measuring the skin color of a person concerned, the hair color of that person is input to determine, within said data base, firstly the group of individuals corresponding to said hair color, and secondly the identical or nearest skin color in the data base for the purpose of associating therewith a reference foundation as predetermined by said data base.

In another particular implementation, in the prior step, the eye color of each individual constituting the data base is input into the data base so as to constitute as many groups of individuals as there are eye colors taken into account; in which case, while measuring the skin color of a person concerned, the eye color of that person is input to determine, within said data base, firstly the group of individuals corresponding to said eye color, and secondly the identical or nearest skin color in the data base for the purpose of associating therewith a reference foundation as predetermined by said data base.

In yet another and particularly preferred implementation, in the prior step, the hair color and the eye color of each individual constituting the data base are input into the data base so as to constitute as many groups of individuals as there are hair and eye colors taken into account; in which case, while measuring the skin color of a person concerned, the hair and eye colors of that person are input to determine, within said data base, firstly the group of individuals corresponding to said hair and eye colors, and secondly the identical or nearest skin color in the data base for the purpose of associating therewith a reference foundation as predetermined by said data base.

According to another particular characteristic of the method of the invention, skin color is measured as follows:

the skin is illuminated, on the inside of the arm, or on the outside of the arm, or on both the inside and the outside of the arm, preferably in a middle region of the forearm where vein color is not particularly apparent, and which does not contain skin marks, illumination being performed under determined lighting conditions, a color image of said skin is taken, preferably in said region, and the color of said skin is determined from said image.

In a particularly advantageous variant implementation, skin color is determined by determining the chromatic parameters of the color of the skin; said data base also contains the chromatic parameters of the skin colors of individuals making up the data base, and the chromatic parameters of the skin color of the person concerned are compared with the chromatic parameters contained in said data base, for the purpose of determining the foundation makeup color in said data base that is associated with said skin color.

In another advantageous implementation of the invention, the chromatic parameters of the color of the skin are defined in the R (red), G (green), B (blue), and Y (luminance) frame of reference.

Preferably, the palette of reference foundation colors in said data base is recorded in the data base in the form of reference codes. Said data base also contains indications enabling a reference code in said palette to be associated with the skin color of at least one individual constituting the data base.

In the context of the invention, the reference foundation colors of the data base are defined in terms of the color of the foundation makeup as applied to a person. This applied foundation color is measured by application to a region of the skin on the inside of the forearm, where the color of the veins is not particularly apparent, and which does not contain skin marks, said person having a skin color that is close to the foundation color to be applied. In the context of the invention, whether in the description or in the claims, the foundation color is always the color of the foundation as applied since the same applied foundation color can be obtained from a variety of raw material colors due to different makeup formulations, e.g. emulsions, creams, fats, powders.

In a preferred implementation of the invention the coordinates of the reference foundation colors of the data base making up said palette when expressed using coordinates in the Lab coordinate system lie respectively in zone A of FIG. 10, in the a,b coordinate plane of FIG. 10 (red, yellow plane), and in zone B in an L,C coordinate plane of FIG. 11 (luminance, saturation plane), which plane is the result of superposing the set of L,C coordinate planes that result from all of the reference foundation colors of said data base for said palette. It should be observed that the saturation coordinate C is mathematically derived from the coordinates a and b by the mathematical relationship $C=\sqrt{a^2+b^2}$. In addition, in the context of the invention, Lab coordinates are determined by a colorimetric method well known to the person skilled in the art. It should be observed that the coordinates obtained by this calorimetric method vary slightly as a function of the type of colorimeter used, but that they remain essentially the same.

In a second aspect, the present invention also provides apparatus for determining a foundation makeup color that substantially reproduces the natural skin color of a person, comprising:

a) measuring means for measuring the color of the skin on the inside of the arm or on the outside of the arm or both on the inside and on the outside of the arm, preferably in a middle region of the forearm in which vein color is not particularly apparent, and which does not contain skin marks;

b) computing and determining means for computing and determining the skin color measured by the measuring means, said computing and determining means comprising a data base containing a palette of reference foundation colors substantially covering a representative sample of a population of given individuals, said data base containing at least the following data:

the color of the skin on the inside of the arm or on the outside of the arm or both on the inside and on the outside of the arm, preferably in a middle region of the forearm in which vein color is not particularly apparent, and which does not contain skin marks; and a reference foundation color associated with one or more of the skin colors in said data base; and c) said computing and determining means comprising means for comparing the measured skin color of the person concerned with the skin colors that appear in the data base to determine which color in the data base is identical or close thereto, and consequently to determine from said data base the foundation color associated with said skin color, and advantageously comprising display means for displaying the determined foundation color.

In a particular variant embodiment, the apparatus also includes in said data base the hair color of each individual constituting the data base so as to constitute as many groups of individuals as there are hair colors taken into account, together with means for inputting the hair color of the person concerned whose skin color is being measured, so as to determine within said data base firstly the group of individuals corresponding to said hair color and secondly the identical or nearest skin color that appears in said data base so as to associate therewith a reference foundation that is predetermined by said data base and which is subsequently displayed by the display means.

According to an advantageous characteristic of the apparatus of the invention, the above-mentioned data base contains the eye color of each individual constituting the data base so as to constitute as many groups of individuals as there are eye colors taken into account, together with means for inputting the eye color of the person concerned whose skin color is being measured, so as to determine within said data base firstly the group of individuals corresponding to said eye color and secondly the identical or nearest skin color that appears in said data base so as to associate therewith a reference foundation that is predetermined by said data base.

According to a particularly preferred other characteristic of the invention, the above-mentioned data base contains the eye and hair colors of each individual constituting the data base so as to constitute as many groups of individuals as there are eye and hair colors taken into account, together with means for inputting the eye and hair colors of the person concerned whose skin color is being measured, so as to determine within said data base firstly the group of individuals corresponding to said eye and hair colors and secondly the identical or nearest skin color that appears in said data base so as to associate therewith a reference foundation that is predetermined by said data base and which is subsequently displayed by the display means.

In a particular embodiment the above-mentioned measuring means for measuring skin color comprise:

a lighting device for illuminating the skin under determined lighting conditions;

means for taking a color image of the skin, preferably comprising a color video camera advantageously having very good color performance; and image reception and processing means for receiving and processing the image to determine said skin color.

In a particular embodiment, the image reception and processing means determine the chromatic parameters of the skin color. In which case, the data base also contains the chromatic parameters of the skin colors of individuals making up the data base.

In an advantageous embodiment, the image reception and processing means comprise computing means, e.g. computer (s) or microcomputer(s), and the above-mentioned display means comprise a screen and/or a printer.

In another advantageous embodiment of the invention, the above-mentioned measurement means comprise a video camera moveably mounted on the structure or frame of the apparatus, at least in translation in a vertical direction and advantageously also pivotally about an axis of rotation that is substantially orthogonal to the vertical translation axis. In an advantageous embodiment, displacement in vertical translation is achieved by sliding the video camera along a rail mounted substantially vertically on the structure of the apparatus.

In another advantageous particular embodiment of the invention, the above-mentioned apparatus of the invention includes at least one table top having means for receiving the forearm of a person concerned, said table top being positioned at an optionally adjustable height to enable the skin color on the forearm of a person concerned to be measured under optimum measurement conditions that are nevertheless comfortable for the person concerned.

Advantageously, the apparatus also comprises a housing, e.g. in the form of a substantially rectangular booth, comprising at least one orifice in its top face for passing the screen of image display means, and a control keyboard for controlling and/or inputting data to a central unit comprising or constituting the image reception and processing means that comprise computing and determining means, e.g. a computer or a microcomputer, and printer means such as a printer.

In a third aspect, the present invention also provides a palette of foundation colors, wherein the coordinates in the Lab coordinate system of the foundation colors constituting the palette lie respectively in zone A of FIG. 10, in the a,b coordinate plane of FIG. 10 (red, yellow plane), and in zone B in an L,C coordinate plane of FIG. 11 (luminance, saturation plane), which plane is the result of superposing the set of L,C coordinate planes that result from all of the reference foundation colors in the palette.

In an advantageous embodiment, said palette of reference foundation colors comprises at least 20 foundation tints whose colorimetric coordinates are situated respectively in the above-mentioned zones A and B of FIGS. 10 and 11.

It will be understood that by means of the invention the above-specified technical problems are solved in a manner that is simple, reproducible, cheap, and capable of being operated without an expert on the commercial premises where it is performed, unlike prior solutions that all require the presence of an expert on site, one way or another.

BRIEF DESCRIPTION OF THE DRAWINGS

Other objects, characteristics, and advantages of the invention appear clearly in the light of the following explanatory description made with reference to the accompanying drawings that show various embodiments of the invention that are given purely by way of illustration and that therefore do not limit the scope of the invention in any way. In the drawings:

FIG. 10 is a figure similar to FIG. 3 superposing two variants of the palette of reference foundation colors in accordance with the present invention together with their standard deviations, a first variant being identical to the palette shown in FIGS. 2 to 9 and corresponding in this case to mat (M) sheen, and a second variation having greater sheen and referred to as satin (S), e.g. because of the presence of a higher concentration of lustering agents; and FIG. 11 is a figure similar to FIG. 5, for the same superposition of the two variants of FIG. 10.

MORE DETAILED DESCRIPTION

Figure 1:
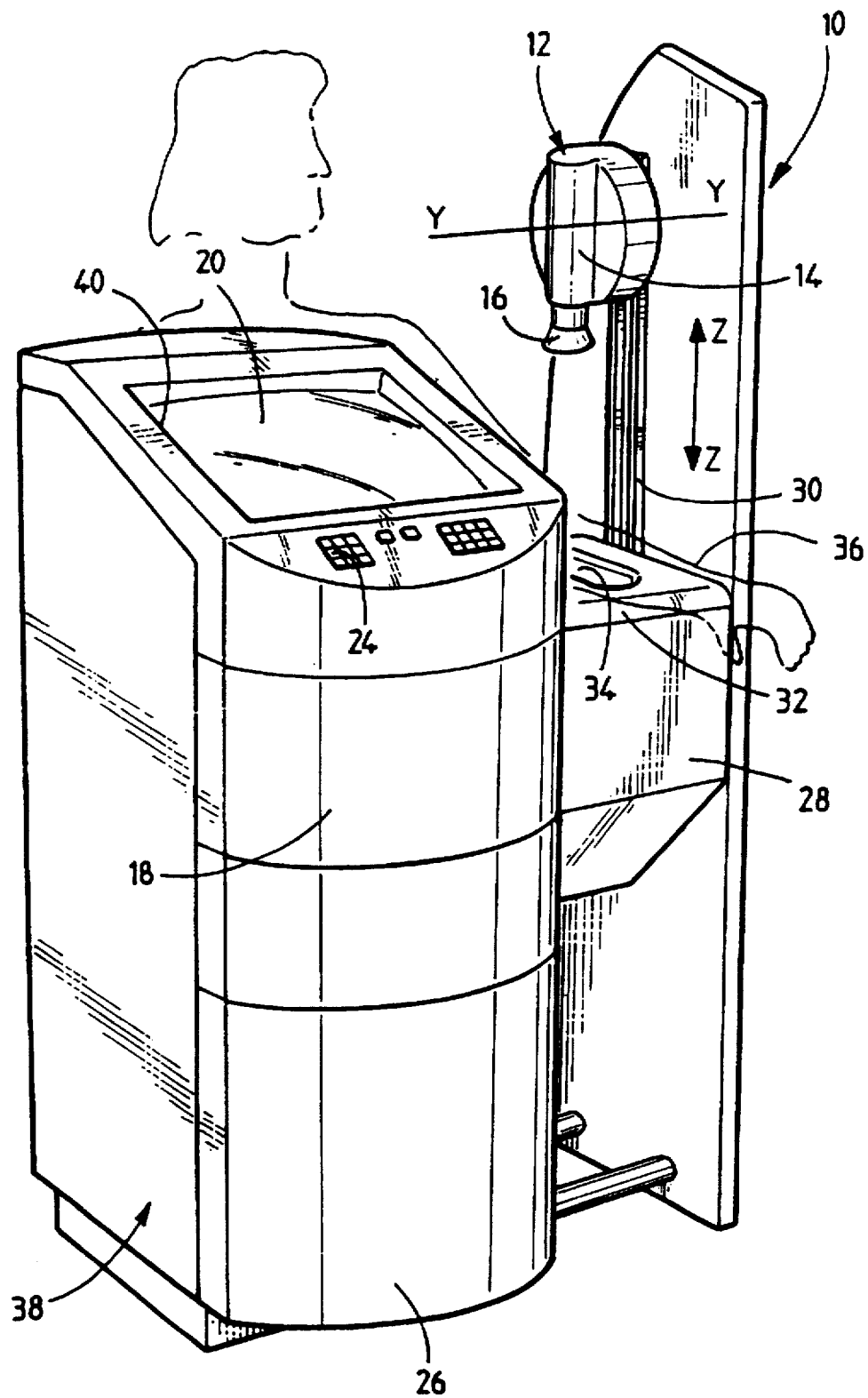
FIG. 1 is a diagrammatic elevation view of apparatus for determining foundation makeup color that substantially reproduces a person's natural skin color.
Figure 2:
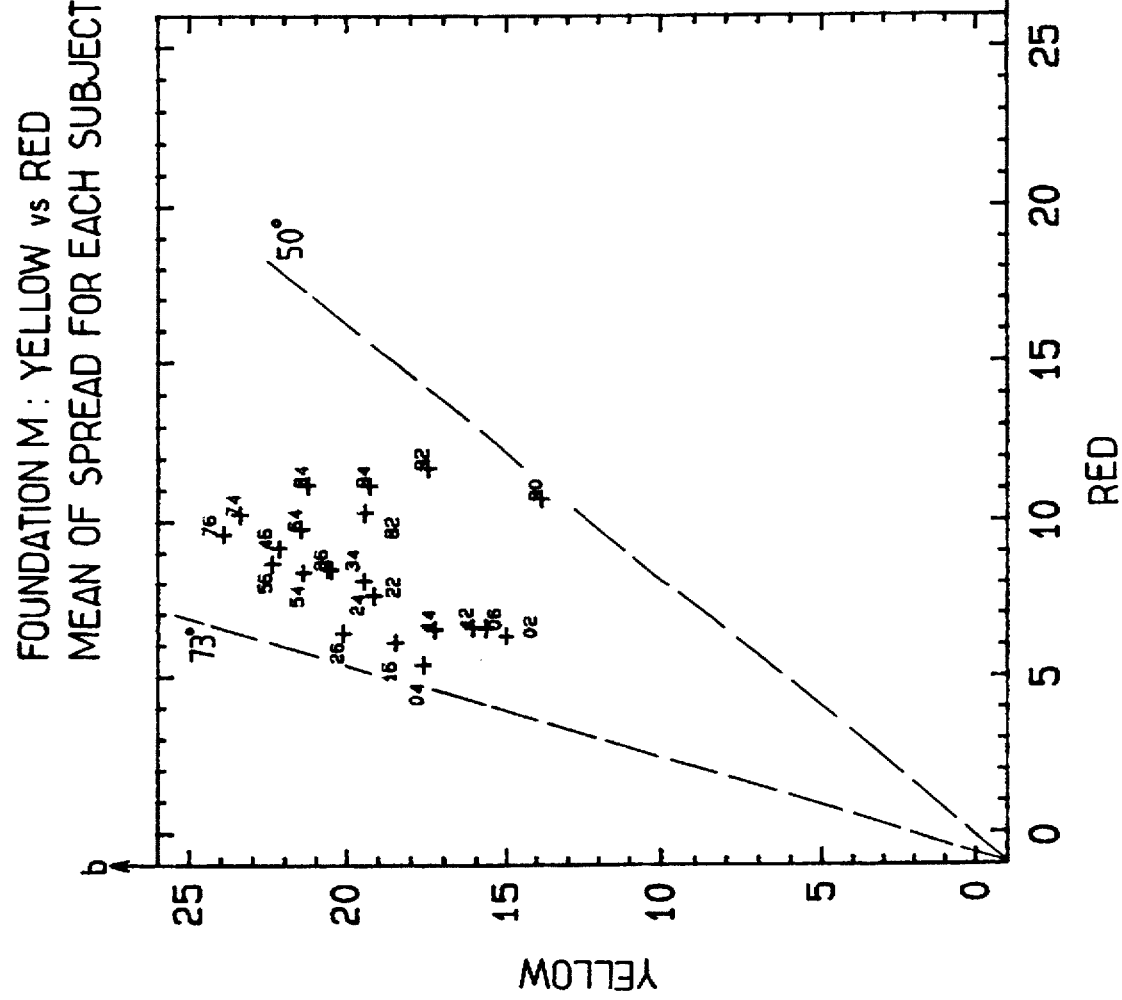
FIG. 2 shows the palette of reference foundation colors associated with their reference codes in the a,b (red, yellow) coordinate plane in the Lab coordinate system, which reference foundation colors are used to constitute the data base used by the apparatus shown in FIG. 1, and also for implementing the method of the present invention.
Figure 3:
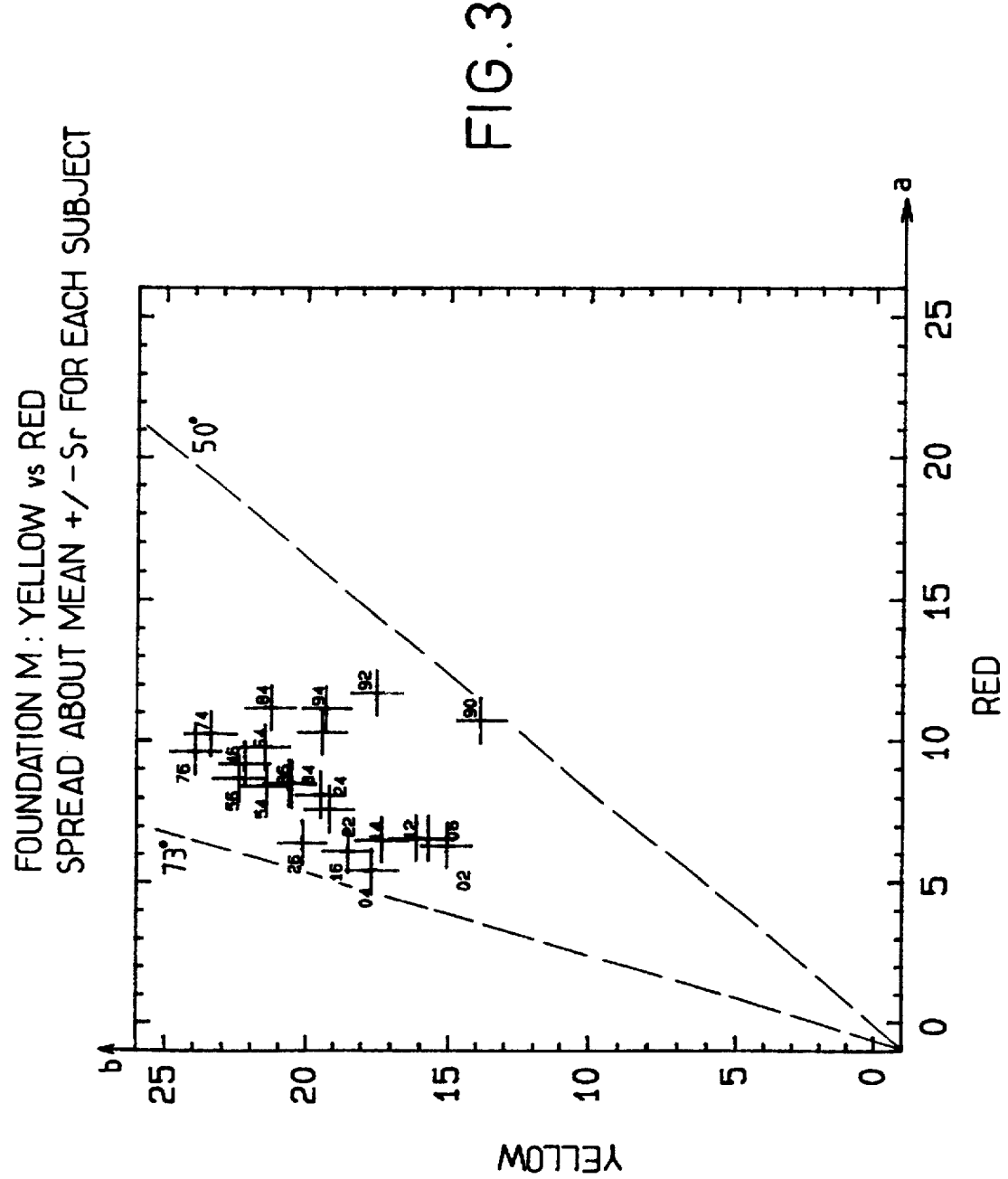
FIG. 3 is a view similar to FIG. 2 but shows the standard deviations for each reference foundation color in the palette.
Figure 4:
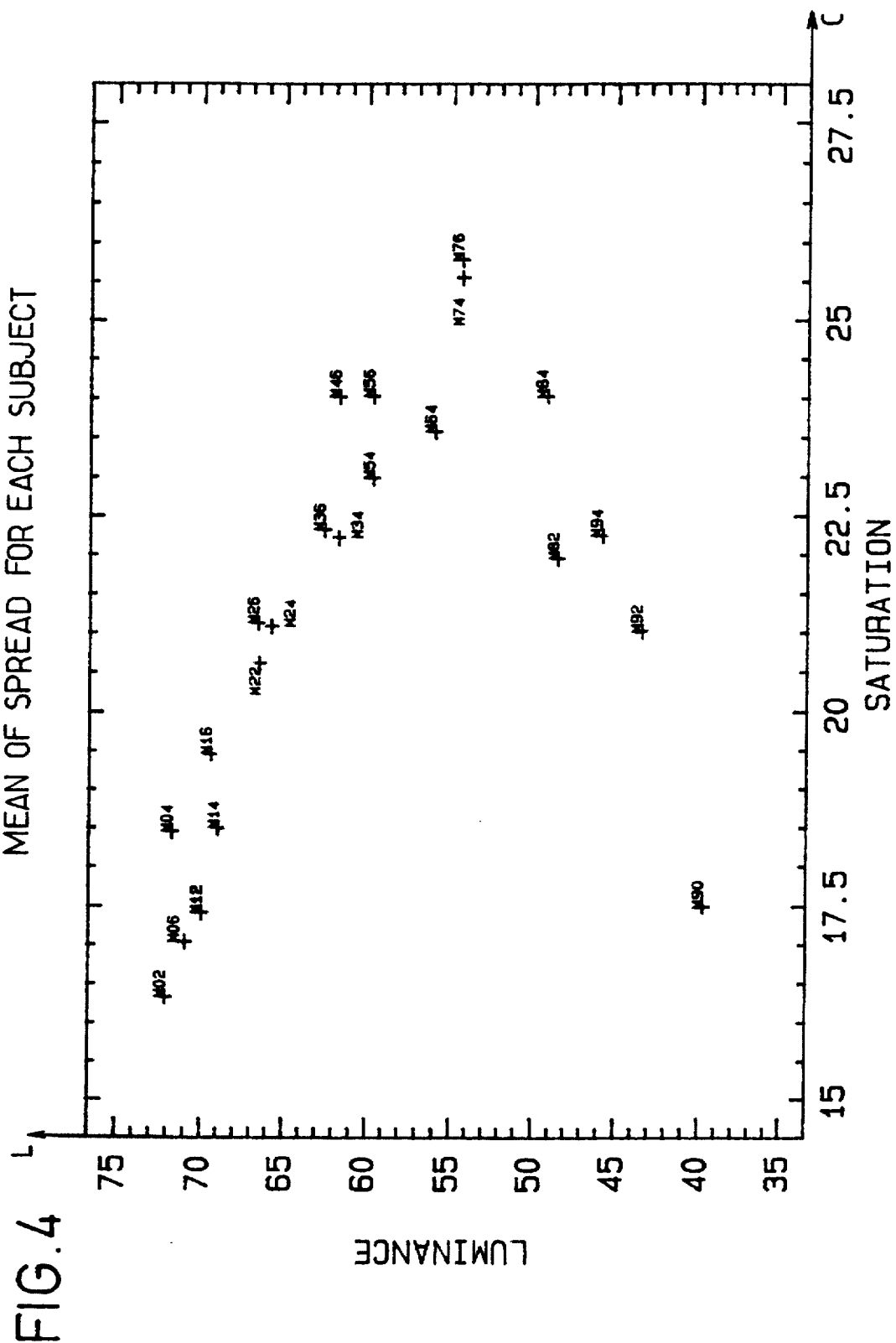
FIG. 4 shows the calorimetric coordinates in the L,C (luminance, saturation) coordinate plane of the Lab system for the set of reference foundation colors in the palette, together with their reference codes, and as used for making up the above-mentioned data base for use by the apparatus of the invention as shown in FIG. 1, and for implementation in the method of the invention.
Figure 5:
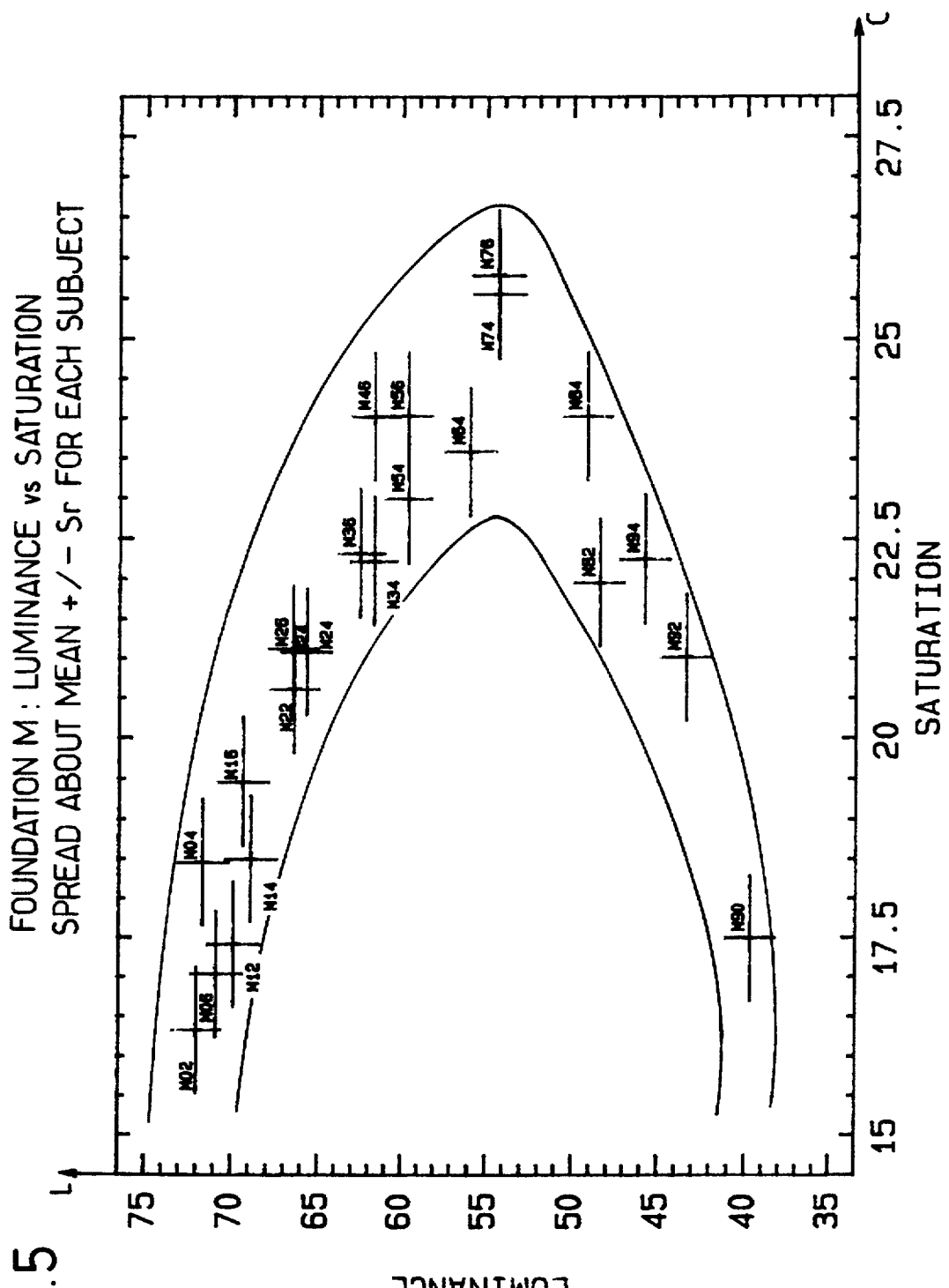
FIG. 5 is a view similar to FIG. 4 showing the standard deviations for each of the foundations in the palette.
Figure 6:
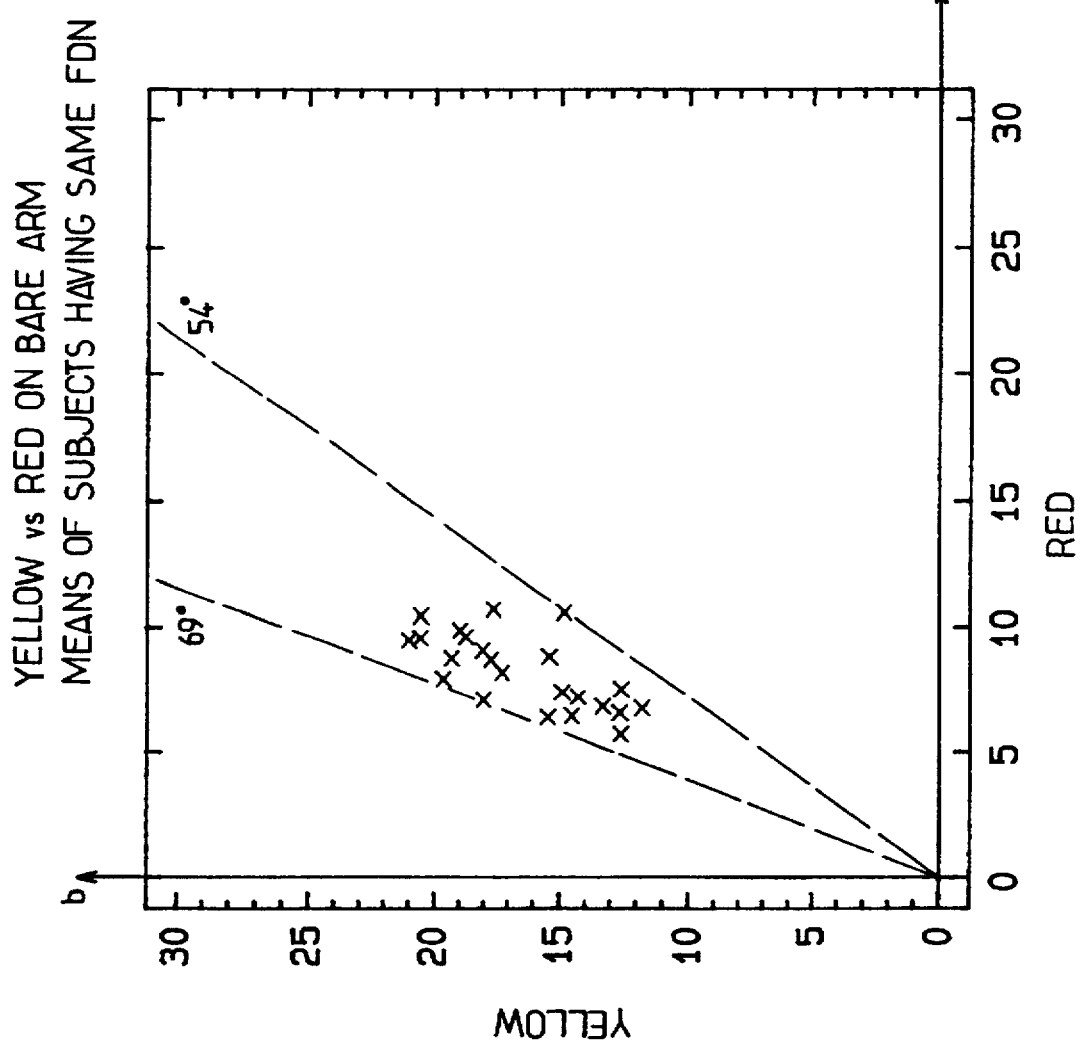
FIG. 6 is a figure similar to FIG. 2 but shows the colorimetric coordinates in the Lab system for the skin color obtained for each individual in a representative sample of a population of individuals concerned and taken into account in the data base as used in the context of the apparatus of FIG. 1 or for implementing the method of the invention.
Figure 7:
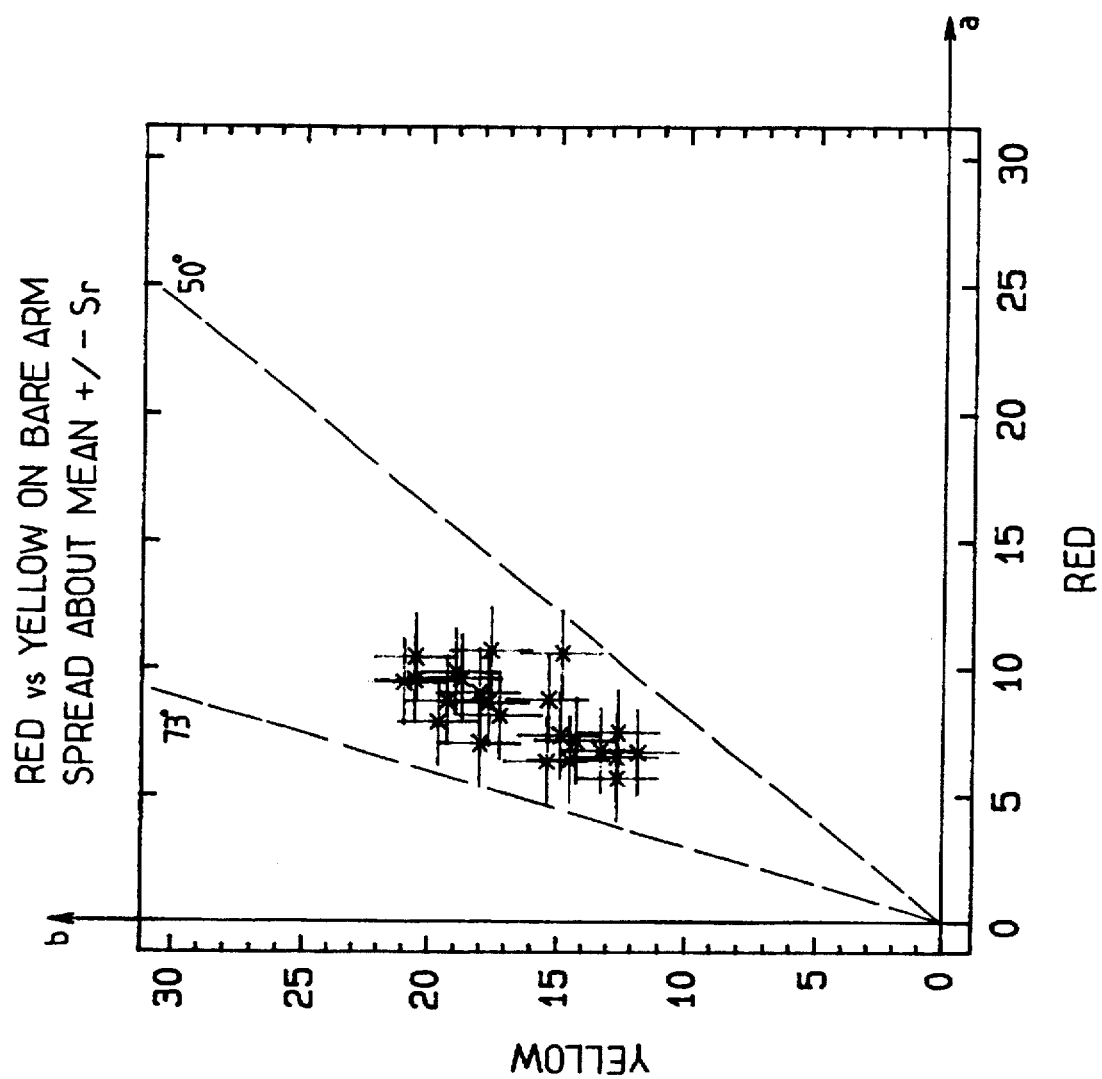
FIG. 7 is a figure similar to FIG. 6 but showing the standard deviation for the coordinates of each individual.
Figure 8:
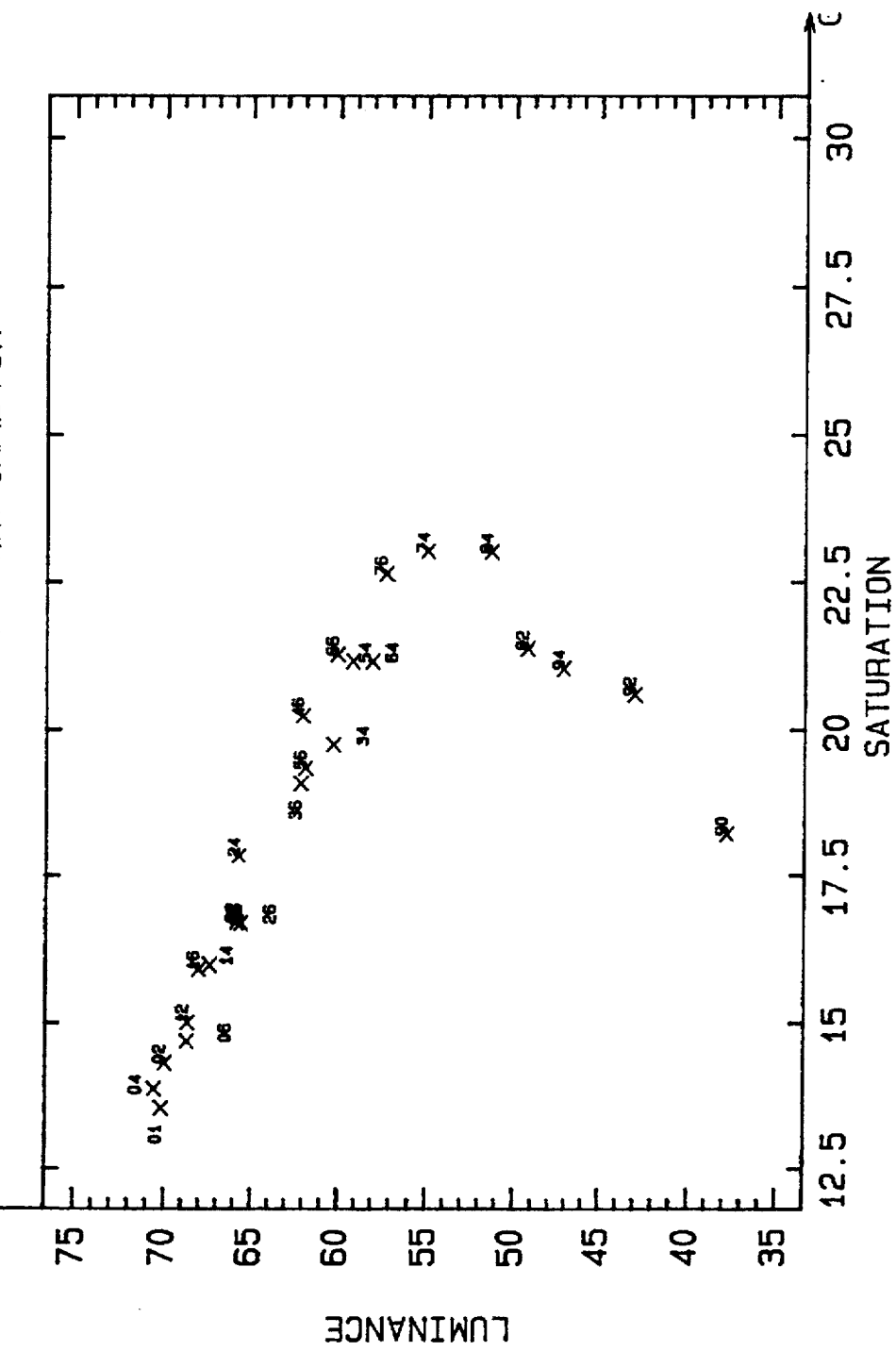
FIG. 8 is a view similar to FIG. 4 in the same L,C colorimetric coordinate plane for the skin color of each individual in the above-mentioned representative sample of the data base.
Figure 9:
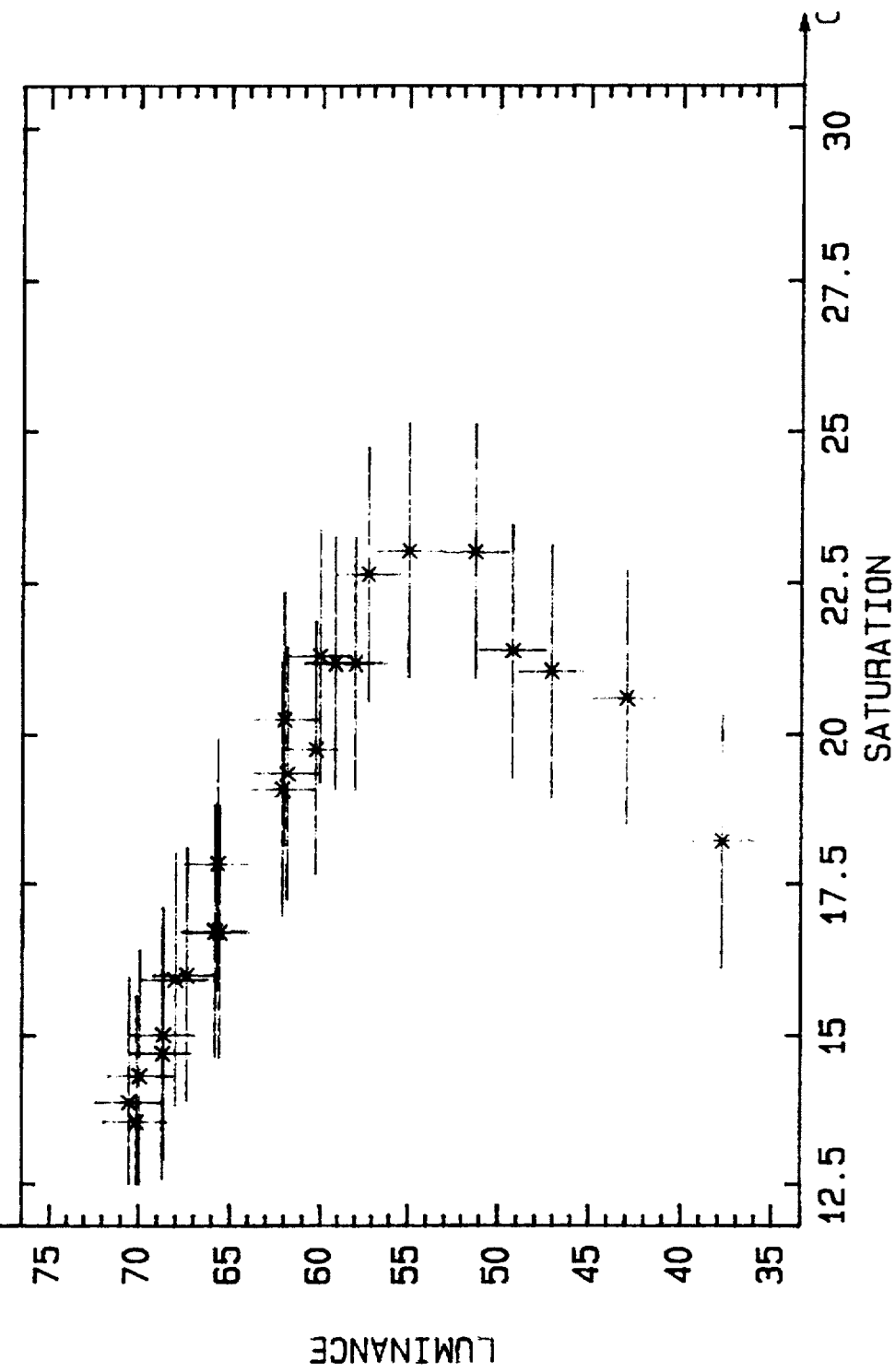
FIG. 9 is a view similar to FIG. 8 but shows the standard deviations of the colorimetric coordinates.

With reference to FIG. 1, apparatus of the invention is given overall reference numeral 10.

The apparatuses comprises means 12 for measuring skin color and comprising, for example, a video camera 14, and lighting means 16 for illuminating the skin of a person concerned under determined lighting conditions. The video camera 14 constitutes means for taking color images. The apparatus also comprises image reception and processing means 18, comprising computing and determining means, e.g. a computer or a microcomputer connected to the video camera 14 in conventional manner via a video card enabling the image obtained by means of the video camera to be stored. The computer or microcomputer may advantageously be fitted with a microprocessor of the 80/386 type or preferably of the 80/486 type having a 40 megabyte hard disk. The computing means may be connected to display means 20, e.g. comprising a video screen such as a VGA type video screen, and/or a printer 26.

The above-mentioned lighting means 16 may, for example, comprise optical fiber lighting means placed in the vicinity of the objective lens of the camera and pointing towards the region of skin to be scanned, centering the light on the center of said region. This region is advantageously a zone on the inside of the arm or on the outside of the arm, preferably a region in the middle of the forearm where the vein color is not particularly apparent, and which does not contain skin marks.

In its memory, the central unit 18 also comprises, either in passive form or preferably in active form, a data base containing a palette of reference foundation colors substantially covering a representative sample of a population of individuals concerned, said data base containing at least the following data:

- the skin color of the inside or the outside of the arm or of both the inside and the outside of the arm, preferably from a middle region of the forearm in which vein color is not particularly apparent, and which does not contain skin marks; and
- a reference foundation color associated with one or more of the skin colors of said data base.

In a variant embodiment, the data base also contains the eye color of each individual making up the data base so as to constitute as many groups of individuals as there are different eye colors taken into account. Under such circumstances, the apparatus also includes means 24 for inputting data, e.g. a keyboard, suitable at least for inputting eye color.

In another variant, the above-mentioned data-base also contains the hair color of each individual making up the data base, and the data input means 24 also enable hair color to be input.

In yet another, and particularly preferred variant, the data base contains both the eye color and the hair color of each individual making up the data base, and the above-mentioned input means 24 serving to input both the eye color and the hair color of the person concerned.

The method of determining the color of foundation makeup that substantially reproduces the natural color of the skin of a person stems clearly from the definition of the method specified in the introduction of the present description, and from the above description of the apparatus. In operation, the following procedure is followed:

a) initially, it will be understood that in a prior step, the data base is established that contains a palette of reference foundation colors substantially covering a representative sample of a population of individuals concerned, said data base containing at least the data specified above with reference to the method, namely the skin color of each individual making up the data base, and a foundation color reference associated with one or more skin colors in the data base; and b) the skin of the forearm of a person concerned is illuminated, on the inside and then preferably also on the outside of the forearm, in a region where vein color is not particularly apparent, and which does not contain skin marks, one or more images are taken using the color image-taking means 12 constituted in this case by a video camera 14, and each color image is transmitted to the reception and processing means 18 via a video card to determine the chromatic parameters of said color image, in particular in terms of R (red), G (green), B (blue), and Y (luminance) coordinates, well known to the person skilled in the art.

These chromatic parameters are then compared with the chromatic parameters in the data base as obtained in the same manner using said apparatus, for the purpose of determining which of the data base colors is identical or close thereto, and consequently of determining the reference of the foundation color associated with said skin color.

In advantageous embodiments, it is also possible to input the eye color and/or the hair color of the person concerned so as to determine in said data base firstly the group of individuals that correspond to said eye color and/or to said hair color prior to determining which skin color in the data base is identical or closest, together with the associated foundation reference as predetermined in the data base.

In an advantageous embodiment of the invention, the above-mentioned measurement means 12 comprise a video camera 14 mounted to move on the structure 28 of the apparatus, at least in translation in a vertical direction Z—Z, and advantageously also mounted to pivot about an axis of rotation Y—Y that is substantially orthogonal to the vertical translation axis Z—Z. In another advantageous embodiment, the vertical translation motion along the axis Z—Z is achieved by sliding the video camera 14 on a rail 30 that is mounted substantially vertically on the structure 28 of the apparatus.

Advantageously, the apparatus 10 may also include at least one table top 32 including means 34 for receiving the forearm of a person concerned, said table top 32 being positioned at a height that is optionally adjustable, so as to enable the skin color of a person concerned to be measured on the forearm under measurement conditions that are optimum while also being comfortable for the person concerned.

The apparatus may also comprise a housing 38, e.g. generally in the form of a rectangular booth, having at least one orifice 40 in its top face for showing the screen of the image display means 20, and a control keyboard 24 for controlling and/or inputting data to a central unit 18 that comprises or constitutes the above-mentioned image reception and processing means, which in turn comprise computing and determining means, e.g. a computer or a microcomputer, and printing means 26 such as a printer.

In the context of the invention, the data base is built up as follows:

firstly, a representative sample of a given population of individuals is selected;

for each of the individuals in this representative sample, a data record is established containing the following information:

a) the color of the skin on the inside of the arm and also, in this case, on the outside of the arm, taken from a middle region of the forearm in which vein color is not particularly apparent, and which does not contain skin marks. This color measurement is performed with the above-described apparatuses of the invention and the resulting color measurements are recorded in the data base, in particular in the form of chromatic parameters, preferably in the R (red), G (green), B (blue), and Y (luminance) frame of reference;

additionally, a reference foundation palette is prepared in an earlier step by an expert, said reference foundation palette associating a reference foundation with at least one individual of the above-mentioned representative sample and vice versa. To simplify, a reference code is given to each foundation, said reference code being input into the data base;

the data base also contains indications relating to the natural color of the hair, and preferably limited to main colors. For a Caucasian type of population, it is advantageous to use six main colors only, namely very fair, fair, red, light brown, dark brown, and black, with the data base being capable of responding positively to one only of said colors;

similarly, the data base also contains indications concerning the color of the eyes of each individual in the above-mentioned representative sample. Preferably, the number of eye colors is likewise limited to main colors. In the above-mentioned example of a Caucasian type of population, it is advantageous to restrict eye color to five main colors, namely pale blue, blue, green, hazel, and brown, with the data base being capable of responding positively to one only of said colors.

It is considered that this reference foundation palette is novel relative to previously known foundation palettes and in particular to the foundation palettes that are commercially available. Said foundation palette is thus considered as being patentable independently from the above-mentioned apparatus and method.

This reference foundation palette is characterized respectively by zone A of FIG. 10 in the a,b coordinate plane of FIG. 10 (red, yellow plane), and in zone B in an L,C coordinate plane of FIG. 11 (luminance, saturation), which plane is the result of superposing the set of L,C coordinate planes that result from all of the reference foundation colors of the said data base for said palette. In an advantageous embodiment, said reference foundation color palette includes at least 20 foundation tints whose colorimetric coordinates are respectively situated in zones A and B of FIGS. 10 and 11. Zone A may be accurately defined as being the zone lying firstly between two straight lines passing through the origin O respectively at about 48° and about 75° relative to the red axis, and secondly between two circular arcs centered on O, with radii corresponding respectively to saturation values of 13 and of 27, and extending between said straight lines, as can clearly be seen in FIG. 10.

To determine the colorimetric coordinates of each of the foundation colors in the palette, a colorimetric method for measuring skin colors that is well known to the person skilled in the art has been used, as described, for example, in the work by Mr. Alain Trouv, published by AFNOR (the French standards body) and entitled (in translation) "Measuring color" (1991) or in the bibliography contained therein, and in particular in the AFNOR, ASTM, and DIN standards on pages 188 to 190, and in particular the following standards: AFNOR X08-001, X08-010; ASTM E 308; and DIN 5 033 part 6.

It will thus be understood that the associated foundation color that substantially reproduces the natural skin color of a person is determined essentially automatically without any need of an expert, thereby guaranteeing reproducibility and reliability. It will also be understood that such apparatus is relatively cheap to implement, in particular given that there is no need for an expert to be present on commercial premises while it is in use.

Other advantages associated with the present invention will also appear to the person skilled in the art. Thus, the invention is not limited in any way to the embodiments described and shown, and it includes any means that constitute technical equivalence of the means described and shown. Furthermore, the embodiments of the apparatus of FIG. 1 and of the foundation palette defined by FIGS. 2 to 11 form an integral part of the present invention and thus of the description. The invention also covers any characteristic that is novel over any state of the art and that appears from the above description taken as a whole and including the accompanying drawings.

In the present specification incorporating the drawings, the capital letters "SR" means: "Residual Standard Deviation".

We claim:

1. A method for determining the foundation makeup color that substantially reproduces the natural skin color of a person, which comprises:

(a) determining at least one first coordinate selected from the group consisting of red, green, blue coordinates and at least one second coordinate selected from the group consisting of luminance and saturation coordinates defining the chromatic parameters of the natural skin color of a person under predetermined lighting conditions, to define therefrom an individual foundation skin color for the person tested;

(b) comparing the foundation skin color for the person tested with at least one first coordinate selected from the group consisting of red, green, blue coordinates and at least one second coordinate selected from the group consisting of luminance and saturation coordinates defining the chromatic parameters of a plurality of reference skin color foundation colors in a palette of reference foundation colors forming a data base incorporating the skin colors of a representative sample of a population of selected persons; and (c) selecting the reference foundation color from the palette which most closely approximates the foundation skin color of the person tested, which may be utilized as the foundation makeup color for that person, wherein the reference foundation color palette of said data base is defined by zone A of FIG. 10 of the drawing in the a, b (red, yellow) coordinate plane of FIG. 10 defined first between the two straight lines passing through the origin O at angles of about 48° and 75° with the red axis, and second between the two circular arcs about origin O having radii corresponding to saturation values of 13 and 27 and extending between the two straight lines, and zone B of FIG. 11 of the drawing in the L, C (luminance, saturation) coordinate plane of FIG. 11 defined between and extending up to the ends of the curved lines therein, which L, C coordinate plane is the result of superposing the set of L, C coordinate planes that results from all of the reference foundation colors in the data base of said palette.

2. A method according to claim 1, which further comprises:

(a) determining the hair color of the person tested;

(b) comparing the hair color of the person tested with the hair colors in a palette of reference hair colors forming a data base incorporating the hair colors of a representative sample of a population of selected persons;

(c) comparing the foundation skin color for the person tested with at least one first coordinate selected from the group consisting of red, green, blue coordinates and at least one second coordinate selected from the group consisting of luminance and saturation coordinates defining the chromatic parameters of a plurality of reference skin color foundation colors for those persons in the data base having the same hair color as the person tested; and (d) selecting the reference foundation color from the plurality of reference skin color foundation colors for those persons in the data base having the same hair color as the person tested, which most closely approximates the foundation skin color of the person tested, which may be utilized as the foundation makeup color for that person.

3. A method according to claim 1, which further comprises:
   (a) determining said at least one first coordinate and said at least one second coordinate defining the chromatic parameters of the natural skin color of a person from a color image of a skin zone on the inside of the forearm of the person tested that does not contain any skin marks and in which no vein color is apparent under predetermined lighting conditions, to define therefrom an individual foundation skin color for the person tested; and
   (b) comparing the foundation skin color for the person tested with at least one first coordinate selected from the group consisting of red, green, blue coordinates and at least one second coordinate selected from the group consisting of luminance and saturation coordinates defining the chromatic parameters of a plurality of reference skin color foundation colors in a palette of reference foundation colors forming a data base incorporating the skin colors of a representative sample of a population of selected persons.

4. A method according to claim 1, which further comprises:
   (a) determining said at least one first coordinate and said at least one second coordinate defining the chromatic parameters of the natural skin color of a person from a skin zone on the inside of the forearm of the person tested that does not contain any skin marks and in which no vein color is apparent under predetermined lighting conditions, to define therefrom an individual foundation skin color for the person tested; and
   (b) comparing the foundation skin color for the person tested with at least one first coordinate selected from the group consisting of red, green, blue coordinates and at least one second coordinate selected from the group consisting of luminance and saturation coordinates defining the chromatic parameters of a plurality of reference skin color foundation colors in a palette of reference foundation colors forming a data base incorporating the skin colors of a representative sample of a population of selected persons.

5. A method according to claim 4, which further comprises:
   (a) determining the hair color of the person tested;
   (b) comparing the hair color of the person tested with the hair colors in a palette of reference hair colors forming a data base incorporating the hair colors of a representative sample of a population of selected persons;
   (c) comparing the foundation skin color for the person tested with at least one first coordinate selected from the group consisting of red, green, blue coordinates and at least one second coordinate selected from the group consisting of luminance and saturation coordinates defining the chromatic parameters of a plurality of reference skin color foundation colors for those persons in the data base having the same hair color as the person tested; and
   (d) selecting the reference foundation color from the plurality of reference skin color foundation colors for those persons in the data base having the same hair color as the person tested, which most closely approximates the foundation skin color of the person tested, which may be utilized as the foundation makeup color for that person.

6. An apparatus for determining the foundation makeup color that substantially reproduces the natural skin color of a person, which comprises:

(a) lighting means for lighting under predetermined lighting conditions a skin zone on the inside of the forearm of said person that does not contain any skin marks and in which no vein color is apparent;
   (b) color image means for obtaining a color image of said skin zone;
   (c) computer means for receiving information from said color image means and for determining the luminance and saturation coordinates and at least one color coordinate selected from the red, green, and blue coordinates defining the chromatic parameters of the natural skin color of said person from said color image to define therefrom an individual foundation skin color for the person tested; and further computer means for comparing the foundation skin color for the person tested, with the luminance and saturation coordinates and at least one color coordinate selected from the red, green, and blue color coordinates defining the chromatic parameters of a plurality of reference skin color foundation colors in a palette of reference foundation colors forming a data base in said computer and incorporating the skin colors of a representative sample of a population of selected persons; said computer means also for selecting the reference foundation color from the palette, which most closely approximates the foundation skin color of the person tested, which may be utilized as the foundation makeup color for that person,
   wherein the reference foundation color palette of said data base is defined by
      zone A of FIG. 10 of the drawing in the a, b (red yellow) coordinate plane of FIG. 10 defined first between the two straight lines passing through the origin O at angles of about 48° and 75° with the red axis, and second between the two circular arcs about origin O having radii corresponding to saturation values of 13 and 27 and extending between the two straight lines, and
      zone B of FIG. 11 of the drawing in the L, C (luminance, saturation) coordinate plane of FIG. 11 defined between and extending up to the ends of the curved lines therein, which L, C coordinate plane is the result of superposing the set of L, C coordinate planes that results from all of the reference foundation colors in the data base of said palette.

7. A method for determining the foundation makeup color that substantially reproduces the natural skin color of a person, which comprises:
   (a) determining the red, green, blue, luminance and saturation coordinates defining the chromatic parameters of the natural skin color of a person under pre-determined lighting conditions, to define therefrom an individual foundation skin color for the person tested;
   (b) comparing the foundation skin color for the person tested with the red, green, blue, luminance and saturation coordinates defining the chromatic parameters of a plurality of reference skin color foundation colors in a palette of reference foundation colors forming a data base incorporating the skin colors of a representative sample of a population of selected persons; and
   (c) selecting the reference foundation color from the palette which most closely approximates the foundation skin color of the person tested, which may be utilized as the foundation makeup color for that person,
   wherein the reference foundation color palette of said data base is defined by
      zone A of FIG. 10 of the drawing in the a, b (red, yellow) coordinate plane of FIG. 10 defined first between the two straight lines passing through the origin O at angles of about 48° and 75° with the red axis, and second between the two circular arcs about origin O having radii corresponding to saturation values of 13 and 27 and extending between the two straight lines, and zone B of FIG. 11 of the drawing in the L, C (luminance, saturation) coordinate plane of FIG. 11 defined between and extending up to the ends of the curved lines therein, which L, C coordinate plane is the result of superposing the set of L, C coordinate planes that results from all of the reference foundation colors in the data base of said palette.

8. A method according to claim 7, which further comprises:

(a) determining the hair color of the person tested;

(b) comparing the hair color of the person tested with the hair colors in a palette of reference hair colors forming a data base incorporating the hair colors of a representative sample of a population of selected persons;

(c) comparing the foundation skin color for the person tested with the red, green, blue, luminance and saturation coordinates defining the chromatic parameters of a plurality of reference skin color foundation colors for those persons in the data base having the same hair color as the person tested; and (d) selecting the reference foundation color from the plurality of reference skin color foundation colors for those persons in the data base having the same hair color as the person tested, which most closely approximates the foundation skin color of the person tested, which may be utilized as the foundation makeup color for that person.

9. A method according to claim 7, which further comprises determining said chromatic parameters of the natural skin color of a person from a color image of a skin zone on the inside of the forearm of the person tested that does not contain skin marks and in which no vein color is apparent, under predetermined lighting conditions, to define therefrom an individual foundation skin color for the person tested.

10. A method according to claim 7, which further comprises determining said chromatic parameters of the natural skin color of a person from a skin zone on the inside of the forearm of the person tested that does not contain skin marks and in which no vein color is apparent, under predetermined lighting conditions, to define therefrom an individual foundation skin color for the person tested.

11. A method according to claim 10, which further comprises:

(a) determining the hair color of the person tested;

(b) comparing the hair color of the person tested with the hair colors in a palette of reference hair colors forming a data base incorporating the hair colors of a representative sample of a population of selected persons;

(c) comparing the foundation skin color for the person tested with the red, green, blue, luminance and saturation coordinates defining the chromatic parameters of a plurality of reference skin color foundation colors for those persons in the data base having the same hair color as the person tested; and (d) selecting the reference foundation color from the plurality of reference skin color foundation colors for those persons in the data base having the same hair color as the person tested, which most closely approximates the foundation skin color of the person tested, which may be utilized as the foundation makeup color for that person.

12. An apparatus for determining the foundation makeup color that substantially reproduces the natural skin color of a person, which comprises:

(a) lighting means for lighting under predetermined lighting conditions a skin zone on the inside of the forearm of said person that does not contain any skin marks and in which no vein color is apparent;

(b) color image means for obtaining a color image of said skin zone;

(c) computer means for receiving information from said color image means and for determining the red, green, blue, luminance and saturation coordinates defining the chromatic parameters of the natural skin color of said person from said color image to define therefrom an individual foundation skin color for the person tested; and further computer means for comparing the foundation skin color for the person tested, with the red, green, blue, luminance and saturation coordinates defining the chromatic parameters of a plurality of reference skin color foundation colors in a palette of reference foundation colors forming a data base in said computer and incorporating the skin colors of a representative sample of a population of selected persons; said computer means also for selecting the reference foundation color from the palette, which most closely approximates the foundation skin color of the person tested, which may be utilized as the foundation makeup color for the person, wherein the reference foundation color palette of said data base is defined by zone A of FIG. 10 of the drawing in the a, b (red, yellow) coordinate plane of FIG. 10 defined first between the two straight lines passing through the origin O at angles of about 48° and 75° with the red axis, and second between the two circular arcs about origin O having radii corresponding to saturation values of 13 and 27 and extending between the two straight lines, and zone B of FIG. 11 of the drawing in the L, C (luminance, saturation) coordinate plane of FIG. 11 defined between and extending up to the ends of the curved lines therein, which L, C coordinate plane is the result of superposing the set of L, C coordinate planes that results from all of the reference foundation colors in the data base of said palette.

* * * * *